(12) United States Patent
Sanghavi et al.

(10) Patent No.: US 8,874,792 B2
(45) Date of Patent: Oct. 28, 2014

(54) DYNAMIC CONSTRUCTION OF MODULAR INVITATIONAL CONTENT

(75) Inventors: Mehul K. Sanghavi, Sunnyvale, CA (US); Michael Froimowitz Greenzeiger, Santa Clara, CA (US)

(73) Assignee: Apple Inc., Cupertino, CA (US)

(*) Notice: Subject to any disclaimer, the term of this patent is extended or adjusted under 35 U.S.C. 154(b) by 302 days.

(21) Appl. No.: 13/345,486

(22) Filed: Jan. 6, 2012

(65) Prior Publication Data

US 2013/0179534 A1 Jul. 11, 2013

(51) Int. Cl.
  *G06F 15/16* (2006.01)
  *G06Q 30/02* (2012.01)
  *H04L 29/08* (2006.01)

(52) U.S. Cl.
  CPC ............ *G06Q 30/0276* (2013.01); *H04L 67/26* (2013.01); *G06Q 30/0244* (2013.01)
  USPC ........... 709/246; 709/203; 709/217; 709/219; 709/224; 705/14.4

(58) Field of Classification Search
  USPC ................. 709/203, 217, 219, 223, 224, 246; 705/14.53, 14, 14.4
  See application file for complete search history.

(56) References Cited

U.S. PATENT DOCUMENTS

| | | | |
|---|---|---|---|
| 4,602,279 A | 7/1986 | Freeman | |
| 5,724,521 A | 3/1998 | Dedrick | |
| 6,247,048 B1* | 6/2001 | Greer et al. | 709/217 |
| 6,442,529 B1* | 8/2002 | Krishan et al. | 705/14.52 |
| 6,502,076 B1 | 12/2002 | Smith | |
| 6,904,408 B1 | 6/2005 | McCarthy et al. | |
| 7,461,061 B2* | 12/2008 | Aravamudan et al. | 707/999.01 |
| 8,108,895 B2* | 1/2012 | Anderson et al. | 725/36 |
| 8,121,893 B1* | 2/2012 | Krikheli et al. | 705/14.4 |
| 8,135,860 B1* | 3/2012 | Brown et al. | 709/246 |
| 8,429,015 B2* | 4/2013 | Do et al. | 705/14.55 |
| 8,468,227 B2* | 6/2013 | Vasudevan et al. | 709/219 |
| 2001/0042081 A1 | 11/2001 | MacFarlane et al. | |
| 2002/0092019 A1 | 7/2002 | Marcus | |
| 2003/0005437 A1 | 1/2003 | Feuer et al. | |
| 2003/0005465 A1 | 1/2003 | Connelly | |
| 2003/0023490 A1 | 1/2003 | Lenyon et al. | |
| 2003/0101454 A1 | 5/2003 | Ozer et al. | |
| 2003/0115318 A1 | 6/2003 | Wueste | |
| 2003/0182567 A1 | 9/2003 | Barton et al. | |
| 2004/0003398 A1 | 1/2004 | Donian et al. | |
| 2004/0015986 A1 | 1/2004 | Carver et al. | |
| 2005/0267798 A1 | 12/2005 | Panara | |
| 2006/0212353 A1* | 9/2006 | Roslov et al. | 705/14 |

(Continued)

*Primary Examiner* — Ramy M Osman
(74) *Attorney, Agent, or Firm* — Novak Druce Connolly Bove + Quigg LLP (57) ABSTRACT

The present disclosure related to constructing invitational content. A content delivery system is provided managing a campaign using a content bundle identifying content blocks and rules for assembling the content blocks into items of invitational content. Based on the response of users to the invitational content, the invitational content to vary and evolve over time by modifying of the content bundle according to the user responses. An analysis of the responses can be performed to determine how the content bundle should be modified for users, user terminals, and other conditions. The content bundle can also specify a set of modification rules that can be used to automatically select how to modify the content bundle based on the user responses. In some cases, a content bundle can be associated with each unit of the content delivery system or each portal serviced by the content delivery system and managed separately.

28 Claims, 5 Drawing Sheets

(56) References Cited

U.S. PATENT DOCUMENTS

| | | |
|---|---|---|
| 2006/0277102 A1* | 12/2006 | Agliozzo .................... 705/14 |
| 2007/0156524 A1* | 7/2007 | Grouf et al. ................ 705/14 |
| 2007/0220010 A1* | 9/2007 | Ertugrul ..................... 707/10 |
| 2007/0260671 A1* | 11/2007 | Harinstein et al. ........ 709/203 |
| 2008/0133340 A1* | 6/2008 | Do et al. .................... 705/14 |
| 2008/0215428 A1 | 9/2008 | Ramer et al. |
| 2009/0070221 A1* | 3/2009 | Carmichael et al. ........ 705/14 |
| 2009/0119179 A1* | 5/2009 | Kolve et al. ................ 705/14 |
| 2009/0144141 A1 | 6/2009 | Dominowska et al. |
| 2009/0199107 A1 | 8/2009 | Lewis et al. |
| 2010/0023393 A1* | 1/2010 | Costy et al. ............. 705/14.43 |
| 2011/0106622 A1 | 5/2011 | Kuhlman et al. |
| 2011/0112906 A1 | 5/2011 | Pulijala et al. |
| 2011/0321003 A1* | 12/2011 | Doig et al. ................. 717/107 |
| 2012/0030023 A1* | 2/2012 | Roslov et al. ........... 705/14.54 |

* cited by examiner

DYNAMIC CONSTRUCTION OF MODULAR INVITATIONAL CONTENT

TECHNICAL FIELD

The present disclosure relates to invitational content and more specifically to construction of invitational content.

INTRODUCTION

When designing a rich media advertisement it is necessary to include a combination of content relevant to the consumer and an interface suited to enabling efficient user navigation. As used herein, the term "rich media advertisement" refers to advertising content configured to allow some level of interaction between the user and the advertisement. However, not all consumers have the same device capabilities, are interested in the same type of content, or prefer to navigate advertisements using the same interface. Accordingly, rich media advertisement developers typically select the content and user interface elements that are suitable for the majority of users. However, this does not guarantee a successful campaign. For example, some users may still prefer primarily to watch videos about products or services advertised while others may prefer to read through product specifications, play games involving the product or brand, or share the content with their friends through social media. Additionally, some users may respond better to a linear advertising experience whereas other may prefer to choose their own path through advertising content; some may prefer to have an entirely passive experience more similar to television advertising.

Additionally, creating a rich media advertisement is frequently a labor-intensive process adding to the costs for the advertiser in developing and modifying the advertisements. Therefore, although it may be desirable to create multiple versions of the advertisement to appeal to a variety of classes of users, it is not necessarily cost-effective or feasible in terms of manpower. Over the course of an advertisement campaign, it often becomes necessary to make changes in advertisement units if they do not perform according to the goals of the advertiser, if those goals change over time, or if new advertising content becomes available. However, because of the initial costs and other inherent limitations, the costs, time, and complexity required for making effective changes are generally too high for many advertisers. Accordingly, the present invention addresses these issues.

SUMMARY

Additional features and advantages of the disclosure will be set forth in the description which follows, and in part will be apparent from the description, or can be learned by practice of the herein disclosed principles. The features and advantages of the disclosure can be realized and obtained by means of the instruments and combinations particularly pointed out in the appended claims.

Disclosed are devices, systems, methods, and non-transitory computer-readable storage media for dynamic construction of modular invitational content from invitational content providers. Invitational content can often times be delivered by a content delivery system configured to retrieve and manage the content from the invitational content providers and other content providers. The present technology provides a content bundle identifying content blocks and rules for assembling the content blocks into items of invitational content can be provided. In addition to delivering the invitational content, the present technology can allow the invitational content to vary and evolve over time in response to users by allowing the modifying of the content bundle according to user responses to the invitational content being generated. In some embodiments, the content delivery system is provided with a means to analyze such responses and determine how the content bundle should be modified. Further, the content bundle can specify a set of modification rules that can be used to select how to modify the content bundle based on the user response. In some embodiments, the modifications can be global or localized. That is, a separate content bundle can be associated with each unit of the content delivery system or each portal serviced by the content delivery system. In such embodiments, content bundles can be modified on a per unit or per portal basis.

With respect to modification of the content bundles, the present technology provides different ways of performing such modifications. In some embodiments, the content bundle can specify modification rules that describe how to automatically adjust the content bundle based on specific patterns of responses. Further, the content delivery system can also specify modification rules for the automatic adjusting. In some embodiments, responsive to an automatic configuration not being possible or feasible based on the modification rules specified by the content bundle, the content delivery system can be configured to propose a modification of the rules beyond that allowed by the content bundle to the invitational content provider. In some cases, an incentive can be provided to elicit an acceptance of the proposal. In other embodiments, such modification can be performed without approval of the invitational content provider by providing an adjusted fee arrangement.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
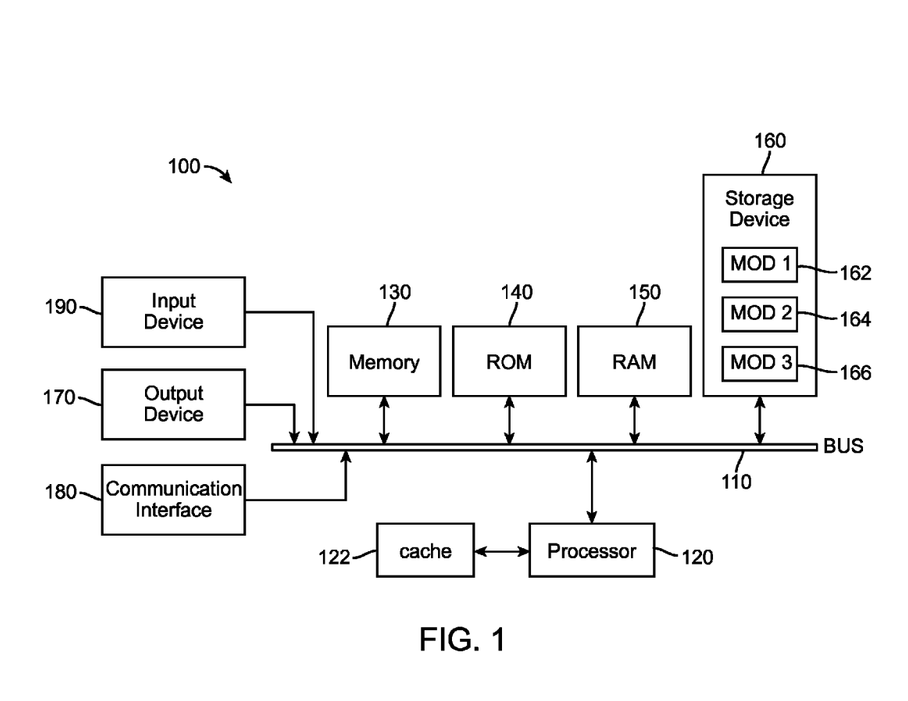
FIG. 1 illustrates an example system embodiment.

FIG. 1 illustrates an exemplary system 100 that includes a general-purpose computing device 100, including a processing unit (CPU or processor) 120 and a system bus 110 that couples various system components including the system memory 130, such as read only memory (ROM) 140, and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache 122 provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer-readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs a hard disk as storage device 160, it should be appreciated by those skilled in the art that other types of computer-readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example, the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod 1 162, Mod 2 164 and Mod 3 166, which are modules configured to control the processor 120. These modules may be stored on the storage device 160 and loaded into RAM 150 or memory 130 at runtime or may be stored as would be known in the art in other computer-readable memory locations.

Figure 2:
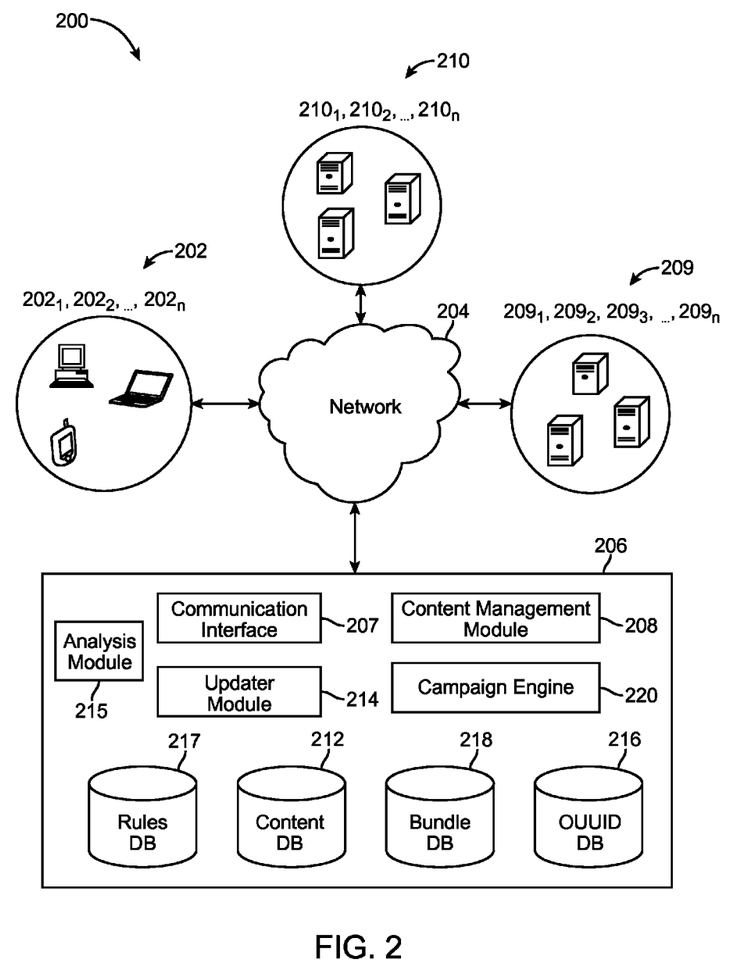
FIG. 2 illustrates an exemplary system configuration wherein electronic devices communicate via a network for purposes of exchanging content and other data.

Having disclosed some components of a computing system, the disclosure now turns to FIG. 2, which illustrates an exemplary system configuration 200, wherein electronic devices communicate via a network for purposes of exchanging content and other data. The system can be configured for use on a network as that illustrated in FIG. 2. However, the present principles are applicable to a wide variety of network configurations that facilitate the intercommunication of electronic devices. For example, each of the components of system 200 in FIG. 2 can be implemented in a localized or distributed fashion in a network.

In system 200, invitational content is delivered to user terminals $202_1 \ldots 202_n$ (collectively "202") connected to a network 204 by direct and/or indirect communications with a content delivery system 206. In particular, the content delivery system 206 receives a request for a content package of electronic-invitational content, such as a web page, an application, a game, or media, etc., from one of user terminals 202. In the various embodiments, one or more types of invitational content can be combined in a content package. The user terminal 202 can be configured to render the received invitational content. This can include display or playing the invitational content appropriately depending on the form of the invitational content. For example, the invitational content can include text, graphics, audio, video, executable code or any combination thereof. Upon successfully rendering the delivered invitational content, the user terminal 202 can be configured to send a notification to the content delivery system 206. In some embodiments the notification can be a web beacon such as an embedded tracking pixel. In some embodiments, the invitational content can be associated with a product or can directly or indirectly advertise a product. In some embodiments, the content package can be configured to replace or update invitational content in a content package already delivered to the user terminal 202.

Further, the invitational content can be active invitational content. That is, invitational content that is designed to primarily elicit a pre-defined response from the user. For example, active invitational content can include one or more types of advertisements configured to be clicked upon, solicit information, or be converted by the user into a further action, such as a purchase or download of the advertised item. However, invitational content can also include passive invitational content. That is, invitational content that is designed to primarily inform the user. In some cases, passive invitational content can include information that can lead or direct users to active invitational content. Additionally, the invitational content can be dynamic invitational content. That is, invitational content that varies over time or that varies based on user interaction with the invitational content. However, the various embodiments are not limited in this regard and the invitational content can be static invitational content that does not vary over time or that varies based on user interaction. In the various embodiments, an invitational content in a content package can be static or dynamic and active or passive. Further, various types of invitational content can be combined in a same content package.

After receiving the request for invitational content, the content delivery system 206 selects the invitational content in response to the request and transmits the assembled invitational content to the requesting one of user terminals 202. In some embodiments, the server has preselected the invitational content before the request is received. Thereafter, the server assembles a content package of invitational content and causes the content package to be delivered to the user. The content delivery system can include a communications interface 207 to facilitate communications with the user terminals 202 and any other components familiar to those of ordinary skill in the art.

The content delivery system 206 includes a content management module 208 that facilitates generation of the assembled content package, which can include invitational content. Specifically, the content management module 208 can combine content from one or more primary content providers $209_1 \ldots 209_n$ (collectively "209") and content from one or more invitational content providers $210_1 \ldots 210_n$ (collectively "210") to generate the assembled content package for the user terminals 202. For example, in the case of a web page being delivered to a requesting one of user terminals 202, the content management module 208 can assemble a content package by requesting the data for the web page from one of the primary content providers 209 maintaining the web page. For the invitational content on the web page provided by the invitational content providers 210, the content management module 208 can request the appropriate data according to the arrangement between the primary and invitational content providers 209 and 210. In some embodiments, device 202 can directly request or already have access to primary content from primary content provider 209. In such embodiments, device 202 can further request invitational content from system 206. System 206 can identify and deliver invitational content appropriate for association with primary content. For example, primary content such as an application can already reside or be running of a device 202, and primary content can direct device 202 to request invitational content from system 206 to be associated with primary content on device 202.

As described above, content maintained by the content providers 209 and 210 can be combined according to a pre-defined arrangement, which can be embodied as a set of rules. In an arrangement where the content delivery system assembles the content package from multiple content providers, these rules can be stored in a rules database 217 in content delivery system 206 and content management module 208 can be configured to assemble the content package for user terminals 202 based on these rules. The rules can specify how to select content from secondary content providers 210 and the primary content providers 209 in response to a request from one of user terminals 202. For example, in the case of a web page maintained by one of primary providers 209 and including variable advertisement portions, the rules database 217 can specify rules for selecting one of the secondary providers 210. The rules can also specify how to select specific content from the selected one of secondary providers 210 to be combined with the content provided by one of primary providers 209. Once assembled, the assembled content package can be sent to a requesting one of user terminals 202. However, the content package is not limited to the content from content providers 209 and 210. Rather, the content package can include other data generated at the content delivery system 206.

Although primary and invitational content providers 209 and 210 are presented herein as separate entities, this is for illustrative purposes only. In some cases, the primary and invitational content providers 209 and 210 can be the same entity. Thus, a single entity can define and provide both the primary and the invitational content.

Although the content management module 208 can be configured to request that content be sent directly from content providers 209 and 210, a cached arrangement can also be used to improve performance of the content delivery system 206 and improve overall user experience. That is, the content delivery system 206 can include a content database 212 for locally storing/caching content maintained by content providers 209 and 210. The data in the content database 212 can be refreshed or updated on a regular basis to ensure that the content in the database 212 is up-to-date at the time of a request from a user terminal. However, in some cases, the content management module 208 can be configured to retrieve content directly from content providers 209 and 210 if the metadata associated with the data in content database 212 appears to be outdated or corrupted.

In the various embodiments, the content delivery system 206 can also include an obfuscated unique user identifier(s) (OUUID) database 216 that can be used for managing sessions with the various user terminal devices 202. The OUUID database 216 can be used with a variety of session management techniques. For example, the content delivery system 206 can implement an HTTP cookie or any other conventional session management method (e.g., IP address tracking, URL query strings, hidden form fields, window name tracking, authentication methods, and local shared objects) for user terminals 202 connected to content delivery system 206 via a substantially persistent network session. However, other methods can be used as well. For example, in the case of handheld communications devices, such as mobile phones, smart phones, tablets, or other types of user terminals connecting using multiple or non-persistent network sessions, multiple requests for content from such devices may be assigned to a same entry in the OUUID database 216. The delivery system 206 can analyze the attributes of requesting devices to determine whether such requests can be attributed to the same user. Such attributes can include device or group-specific attributes.

In some embodiments, the content delivery system 206 can also include a campaign engine 220 which can be configured to fulfill campaigns for content providers 210 by managing inventory and pricing of invitational content delivered to user terminals 202. In the various embodiments, the campaign engine 220 engages in an inventory atom-based booking and atom-based pricing system. That is, the space for invitational content provided by primary content providers 210 is managed as an inventory or collection of atoms defining an inventory space or region in a k-dimensional space of atoms, where each of the k dimensions is associated with one of a plurality of traffic segment characteristics. In the various embodiments, the k dimensions can include both orthogonal and non-orthogonal dimensions. That is, some of the k dimensions can overlap or can be related in some aspect. For example, if separate dimensions are specified for city and state, these dimensions are non-orthogonal.

In the various embodiments, each atom represents a portion of traffic associated with a specific set of values for the traffic segment characteristics in the k-dimensional space. For example, an atom can represent a fixed number of impressions for a particular segment. The inventory space will consist of one or more portions of the k-dimensional space depending on the segment characteristics associated with the content space available from the primary content providers 209. Accordingly the content delivery system 206 can manage an electronic campaign for one or more secondary content provider 210 based on the one or more segment characteristics of interest to each of the secondary content providers 210. In the various embodiments, the segment characteristics can include demographic characteristics, channel characteristics, spatial-temporal characteristics, behavioral characteristics, and demographic characteristics, to name a few. Channel characteristics can define the specific delivery channel being used to deliver a content package. For example, channel characteristics can include a type of electronic content, a type of device or user terminal, a carrier or network provider, or any other characteristic that defines a specific delivery channel for the content. Spatial-temporal characteristics can define a location, a date, a time, or any other characteristic that defines a geographic location and/or a time for delivery of the content. Demographic characteristics can define characteristics of the users targeted by the content or associated with the content. For example, demographic characteristics can include age, income, and ethnicity, but can also include other demographic characteristics such as gender, occupation, or any other user characteristics. Behavioral characteristics can define user behaviors for one or more different types of content, separately or in combination with any other contextual characteristics. That is, different behavioral characteristics may be associated with different channel, demographic, or spatial temporal characteristics. For example, users may be associated with higher conversion or response rates for some types of delivery channels.

Content providers 210 can arrange to have their invitational content delivered by the content delivery system 206 to user devices not only based on meeting targeting criteria, but also based on a pricing scheme. Further, the pricing scheme can be based on eliciting a specified user response. For example, in some embodiments the pricing scheme can be arranged so that a content provider 210 is charged a set price for eliciting a user response of viewing the invitation content. A user viewing the invitational content can be measured as an invitational content impression. An impression can be counted as every time an item of invitational content is displayed at the user terminal 202 for at least a predetermined amount of time. For example, if the invitational content is a banner advertisement, an impression can be counted if the banner advertisement is displayed on a user terminal 202 for 3 seconds. In some embodiments the predetermined time can vary according to the invitational content. For example, the invitational content can be a video and so an impression can be counted upon completion of the video.

In some embodiments, the pricing scheme can be based on eliciting a user response to invitational content. For example, a campaign can charge for each conversion associated with delivered invitational content. A conversion can be counted in many ways, for example, in some embodiments a conversion can be counted when a user clicks on a banner advertisement and is forwarded to additional content. In some embodiments a conversion can be counted when a user purchases a product advertised by the invitational content. Although impression and conversion are used as examples, any pricing scheme or combination of can be used.

A content provider 210 can arrange a campaign in any number of ways. In some embodiments, a content provider 210 can choose a maximum cost limit for a period of time. For example a campaign can be configured so that the cost of delivering the invitational content does not exceed $10,000 over a month. In some embodiments the campaign can be configured to have a price limit over a time interval as well as another limit for a smaller time period. For example, a campaign can be allocated $10,000 over a month, but not to exceed $500 in any given day. Campaigns can also be configured to have a minimum amount to be spent per a certain time period. For example, a campaign can have a daily max of $1,000 per day as well as a minimum of $950 per day. These examples are not meant to be limiting, campaigns can be configured in any number of ways known in the art.

The campaign engine 220 can be arranged to manage the delivery of the invitational content based on the parameters of the campaign. For example, if a content provider 210 has arranged a maximum limit of $1,000 per day, the campaign engine 220 can monitor the number of impressions and conversions, and upon the limit being reached, no longer deliver the item of invitational content. Ensuring that the maximum limit is not exceeded can be important because in some embodiments the content provider 210 is not liable to pay more than the maximum limit per day and so any impression or conversion above the limit would be free of charge to the content provider 210.

In addition to the above-mentioned components, the content delivery system 206 can further include an analysis module 215 for evaluating the performance of a campaign. The analysis can be performed in various ways and can provide various types of results. For example, the analysis module 215 can generate metrics for the campaign, provide a comparison of the campaign to specific criteria, generate values indicating that one or more conditions or criterion have been met, or any combinations thereof. These exemplary analysis methods are provided solely for illustrative purposes and any other methods can be used without limitation. The results of the analysis can be communicated to an invitational content provider associated with a campaign, components within content delivery system 206, or any combination thereof.

The analysis module 215 can collect the data for evaluating a campaign from various sources. For example, the content delivery system 206 can be configured to maintain, as part of analysis module 215 or elsewhere, a journal of user responses to particular content blocks. The data for the diary can be obtained from various sources. For example, the content delivery system 206 can directly monitor responses to the invitational content it generates and update the diary accordingly. In another example, the content delivery system 206 can query the invitational content provider (such as content provider 210) to obtain information regarding responses to the invitational content and update the diary accordingly. In still another example, a user terminal 202 could be configured to archive responses locally and provide the results to the content delivery system 206 at a later time. Thereafter, the content delivery system 206 can update the diary accordingly.

As described above, one aspect of the present technology is the gathering and use of data available from various sources to improve the delivery of advertisements or any other content that may be of interest to users. The present disclosure contemplates that in some instances, this gathered data may include personal information data that uniquely identifies or can be used to contact or locate a specific person. Such personal information data can include demographic data, location-based data, telephone numbers, email addresses, social media IDs such as TWITTER IDs, home addresses, or any other identifying information.

The present disclosure recognizes that the use of such personal information data in the present technology can be used to the benefit of users. For example, the personal information data can be used to better understand user behavior, facilitate and measure the effectiveness of advertisements, applications, and delivered content. Accordingly, use of such personal information data enables calculated control of the delivered content. For example, the system can reduce the number of times a user receives a given advertisement or other content and can thereby select and deliver content that is more meaningful to users. Such changes in system behavior improve the user experience. Further, other uses for personal information data that benefit the user are also contemplated by the present disclosure.

The present disclosure further contemplates that the entities responsible for the collection, analysis, disclosure, transfer, storage, or other use of such personal information data should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after the informed consent of the users. Additionally, such entities would take any needed steps for safeguarding and securing access to such personal information data and ensuring that others with access to the personal information data adhere to their privacy and security policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for advertisement delivery services. In yet another example, users can configure their devices or user terminals to prevent storage or use of cookies and other mechanisms from which personal information data can be discerned. The present disclosure also contemplates that other methods or technologies may exist for blocking access to their personal information data.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

As noted above, one cornerstone of a successful campaign is providing invitational content that elicits a preferred response from the targeted segment. However, the constraint that many invitational content providers typically face is that their ability to provide adjustment during campaign is generally limited. In particular, adjustment of targeted segments is generally not available. For example, invitational content providers may be contractually bound to the originally selected targeted segments. In such cases it may be possible to retool the invitational content for the campaign, but the cost of the development of additional invitational content can be prohibitive. As a result, many campaigns, although being properly managed by campaign engine 220, may be performing at sub-optimal level in conventional content delivery systems since the invitational content is not specifically tuned to the elicit a preferred response from the targeted segment. In the present technology, the content delivery system 206 can be configured to address the limitations of creating and managing campaigns.

A first aspect of the present technology is to structure invitational content using a modular approach. That is, rather than requiring that the invitational content provider provide the invitational content as a complete, single unit substantially ready to be delivered, the invitational content can instead be defined as a collection of content blocks that can be assembled by the content delivery system 206 to form the invitational content.

In the various embodiments, the content blocks can include fixed content blocks and variable content blocks. The fixed content blocks can be used to define the general framework or structure for an item of invitational content. The variable content blocks can define the specific content that can be included in the framework. Additionally, the variable content blocks can be configured to allow them to be combined with more than one fixed content block. Thus, the variable content portions can be configured to be interchangeable with respect to each other and with respect to one or more fixed content blocks.

For example, in one configuration, the fixed content blocks for forming items of invitational content can be embodied as a series of templates for rich media advertisements that contain the basic structures possible for various types of advertisements. Such a template could define, for example, if and when videos are to be played, what form a menu of the rich media advertisement could take, and what types of user interactions are possible for navigating through the rich media advertisement. Thus, to form such rich media advertisements, an advertiser could choose the template they prefer for their advertising content and then select which elements (i.e., variable content blocks) would be combined with the template. Such a configuration allows the advertiser to define a specific configuration for their electronic advertisement. However, the interchangeability of the fixed and variable content blocks allows the template to be selected by the content delivery system 206 as part of the optimization process on the level of individual users or classes of users. For example, by selecting different templates (i.e., fixed content blocks) for the different users or classes of users.

A second aspect of the present technology is to provide a new methodology for controlling individual campaigns in view of the modularization of the invitational content. That is, a methodology for managing the use of content blocks. In particular, in the various embodiments provide for controlling individual campaigns by specifying a content bundle associated with the campaign. In the various embodiments, a content bundle is a collection of various types of bundle data that can be useful for assembling invitational content and that can be updated at any time by the invitational content provider, the content delivery system 206, or both. At a minimum, the bundle data can identify fixed and variable content blocks for the campaign and a set of assembly rules. The assembly rules for the campaign can specify how to combine the fixed and variable content blocks to form items of invitational content for the campaign, as described above. The assembly rules can be configured to be dependent on the user terminal 202 to which the invitational content is to be delivered. For example, the assembly rules can specify particular ones of the fixed and variable content blocks for user terminal 202 based on one or more properties of the user terminal 202, one or more preferences or characteristics of the user associated with the user terminal 202, properties or characteristics of the network 204, and any combination thereof. The listed properties and characteristics are provided solely for illustrative purposes and any other properties or characteristics can be used without limitation to determine a combination of content blocks for an item of invitational content.

In the various embodiments, the properties or characteristics used by the assembly rules for the content bundle can be stored at a variety of locations. For example, in some cases, the content delivery system can maintain a database of such preferences for various users, devices, obfuscated unique user identifier(s), networks, etc. . . . In another example, such a database can be maintained by any of providers 209 and 210. In either case, the assembly process can include accessing such databases to obtain appropriate information. In yet another example, such data can be requested from the requesting user terminal 202. In still another example, a variety of methods can be utilized to determine or at least estimate the characteristics or properties for the user terminal 202 requesting content. Any other methods of obtaining and storing such information can also be used, without limitation, in the various embodiments.

In operation, the content management module 208 can still access the rules database 217 to determine how to assemble invitational content to be delivered to the user terminal 202. In one configuration, the entry assembling invitational content for the campaign in rules database 217 can simply provide a pointer to the corresponding content bundle in bundle database 218. Thus, the content management module 208 accesses the content bundle in the bundle database 218 and assembles the item of invitational content accordingly. Accordingly, to update the invitational content for the campaign, the existing content bundle is simply replaced or updated in the bundle database 218. In another configuration, the data for the content bundle can be directly stored in rules database 217. In such a configuration, the bundle database 218 can be used to store a content bundle consisting of a set of pointers to the data in rules database 217. Accordingly, to update the invitational content for the campaign, the content bundle can be used to facilitate access to the corresponding portions of the rules database 217 to update the appropriate entries therein.

As described above, the content bundle is modifiable by various entities. However, in some embodiments, as described in greater detail below, automatic or semi-automatic updating of the content bundle can be performed by an updater module 214 in the content delivery system 206. In such embodiments, the content bundle can provide a set of modification rules so that when specific conditions are met, the rules trigger specific changes in the content bundle. Specifically, the analysis module 215 can forward its analysis to updater module 214. Thereafter, the updater module 214, based on the modification rules and the analysis can determine if and how the content bundle can be modified. For example, if the analysis of the campaign indicates that certain content blocks tend to elicit preferred responses from certain types of users, the modification rules can provide for adjusting the assembly rules in the content bundle so that those content blocks are always presented to such types of users in order to elicit a greater number of preferred responses. Similarly, if the analysis of the campaign providers indicates that certain content blocks do not tend to elicit preferred responses from certain types of users, the modification rules can provide for adjusting the assembly rules in the content bundle so that those content blocks are not presented to such types of users in order to elicit a greater number of preferred responses.

The present technology therefore provides a simplified design and updating process for electronic advertisements and other invitational content. For example, even though not all consumers have the same device capabilities, are interested in the same type of content, or prefer to navigate advertisements using the same interface, it is not necessary to make the typical compromise of selecting the content and user interface elements that are suitable for the majority of users. Instead, the present technology allows advertisement experience to be customized for each user at each interface. That is, over the life of the campaign, it is possible to give users the content and interface they prefer which would potentially lead to greater user engagement and deliver a superior value to the advertiser in terms of user engagement and advertising results. Some exemplary methodologies for managing such content bundles are generally described with respect to FIGS. 3, 4, and 5.

Figure 3:
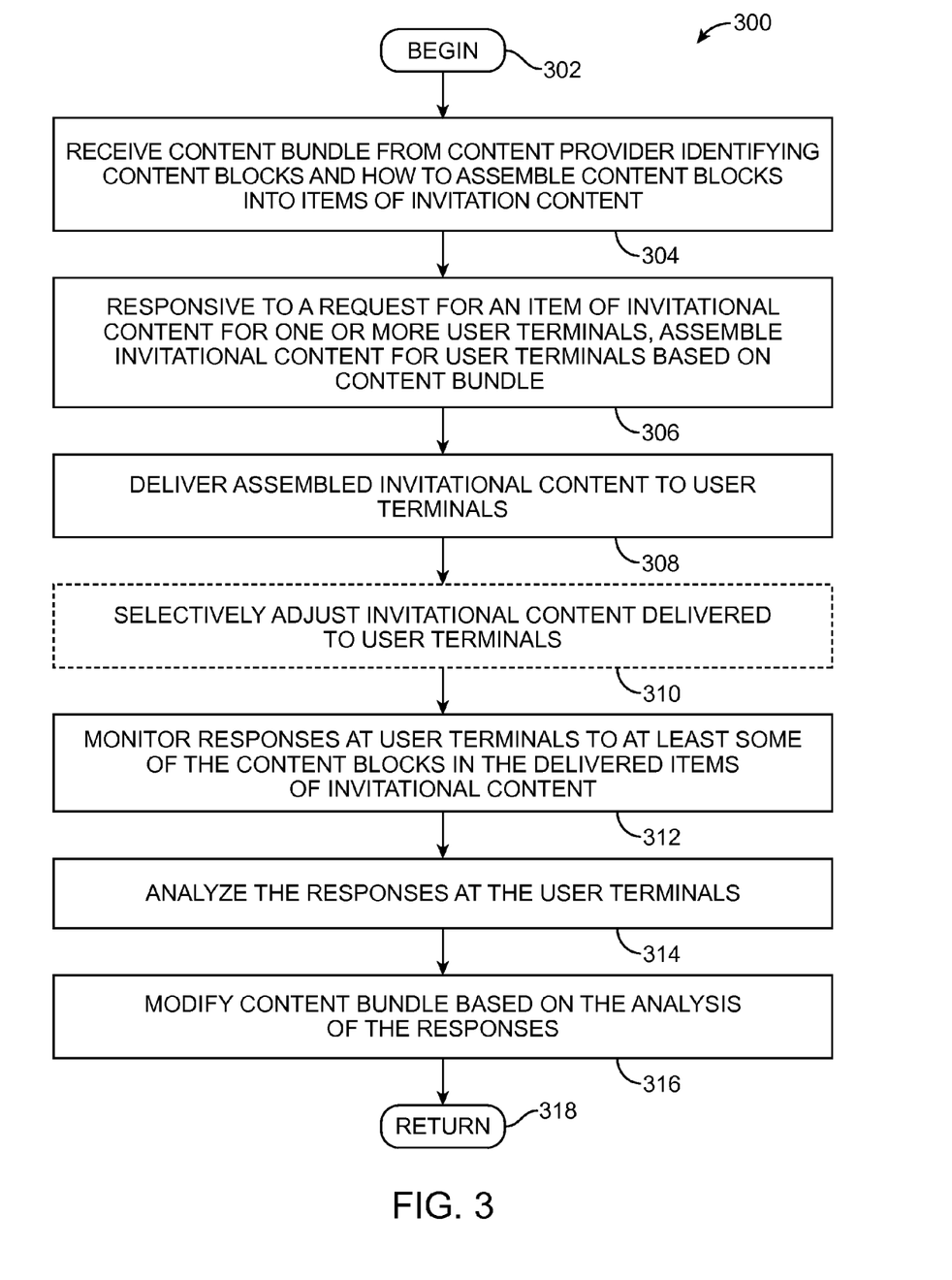
FIG. 3 illustrates an exemplary method embodiment for providing dynamic construction of modular invitational content.

FIG. 3 illustrates an exemplary method embodiment 300 for providing dynamic construction of modular invitational content. Method 300 begins at block 302 and continues on to block 304. At block 304, a content bundle is received at the content delivery system 206 from an invitational content provider associated with a campaign. As previously described, the content bundle can identify the content blocks for assembling invitational content for the campaign and rules for assembly thereof. The content bundle can be integrated into the content delivery system 206 as previously described.

Once the campaign is established and the initial content bundle is received at block 304, the method 300 proceeds to block 306. At block 306, responsive to receiving a request to deliver invitational content to a user terminal 202, the appropriate invitational content is assembled. In particular, once the campaign engine 220 and the content management module 208 determine which campaign invitational content is to be generated for the user terminal 202, the corresponding content bundle is used to determine the content blocks available for the invitational content and the assembly rules are used to assemble the invitational content for the request. Block 306 also includes obtaining data regarding any properties or characteristics associated with the assembly rules, as previously discussed. Further, block 306 can also encompass storing such data for future reference. Once the invitational content is assembled at block 306, the response to the request is delivered at block 308, including delivery of the assembled invitation content.

In some configurations, the content delivery system 206 can selectively adjust the content delivered to the user terminals at block 310. For example, the content bundle can specify a particular combination of content blocks for a user terminal of a specific type and associated with a category of user. However, the user terminals may be operating on a network with limited bandwidth or that does not support transmission of certain ones of the selected content blocks. In such cases, the content delivery system 206 can intercept the invitational content prior to delivery and adjust in accordance with other conditions or criteria not specified in the content bundle. For example, in the example above, the content delivery system 206 can automatically downgrade the certain ones of the content blocks to other content blocks with lower bandwidth requirements. Any other conditions and criteria, as well as rules, can be specified at the content delivery system 206 to support this adjustment.

After the invitational content is received at the user terminal 202, the response to the invitational content can be monitored at block 312. For example, as described above, a journal can be provided in analysis module 215 to make note of the responses. Thereafter, at block 314, the responses at the user terminal can be analyzed by analysis module 215, as previously described. In the various embodiments, the responses can be monitored and analyzed in various ways. That is, in addition to the methods already described above, the responses can also be analyzed in a segmented or divided manner. For example, the responses can be analyzed with respect to the portal on which the invitational content appears. In another example, in a configuration where the content delivery system is embodied as a plurality of content delivery systems working cooperatively or independently, the responses can be analyzed with respect to each of the content delivery systems. However, these are but a few exemplary methods of segmenting or dividing the analysis. In the various embodiments, the monitoring and the analysis can be performed with respect to any segments or divisions of interest without limitation. Further, these segment or divisions can be specified by the invitational content provider, the content delivery system, or both.

Following the analysis of the responses at block 314, the content bundle can be modified or updated by the updater module 214 based on the analysis at block 316. As noted above, the modifying of the content bundle can be performed manually or automatically to adjust the content blocks available and the assembly rules for the content blocks. These processes are described below in greater detail with respect to FIGS. 4 and 5. After the content bundle is modified or updated, the method 300 proceeds to block 318 and resumes previous processing, including repeating method 300.

As noted above, a significant result of method 300 is that different users can receive invitational content that consists of different combinations of content blocks. The present technology contemplates that the content delivery system, via the campaign manager 220 or other elements, can adjusts costs incurred based on the content blocks being delivered. That is, alternatively or in combination with impression-based, conversion-based, or any other pricing schemes, a cost per feature scheme can be utilized in the various embodiments. In one configuration, this can simply be a cost based on the particular content blocks being delivered to the user terminal 202. In another configuration, the cost can be based on the content blocks actually utilized by a user at the user terminal 202. For example, if the invitational content includes a content block defining a video, the cost would apply only if the user views the video. Further, the degree of interaction might also define the costs. For example, if the user fails to view the entire video, different costs may apply. In still another example, such as in the case of adjusting content blocks, as described above with respect to block 310 in FIG. 3, the cost can be based on what is finally delivered to the user terminal 202. Additionally, any combination of the above and any other scheme based on pricing based on delivered content blocks, user interaction with the content blocks, or any combination thereof can be used in the various embodiments without limitation.

Additionally, a cost per feature arrangement can allow the invitational content provider to obtain not only a more knowledge of how the campaign is operating, but also provides an ability to customize precisely what invitational content experiences the invitational content provider wishes to purchase. For example, an invitational content provider can purchase or target specific numbers of video views, app downloads, and other experiences. Further, with the knowledge of the particular experiences the invitational content provider wishes to purchase, the campaign manager 220 can more intelligently select which invitational content and which campaigns to select invitational content from during operation of the content delivery system 206. Additionally, the content bundle can also be used to adjust such targets. For example, for the number of impressions or conversions purchased by the invitational content provider, the content bundle can be used to dynamically adjust the experience for each of these. Further, in some instances, such adjustments can be utilized by campaign manager 220 to contain costs for the invitational content provider. For example, if the campaign manager needs to provide invitational content, but the desired experience is not available due to user, user terminal, network, or other conditions, the campaign manager can provide invitational content at a discount or even free of charge. Thus, most, if not all, of the budget for the campaign is reserved for the desired experiences.

Figure 4:
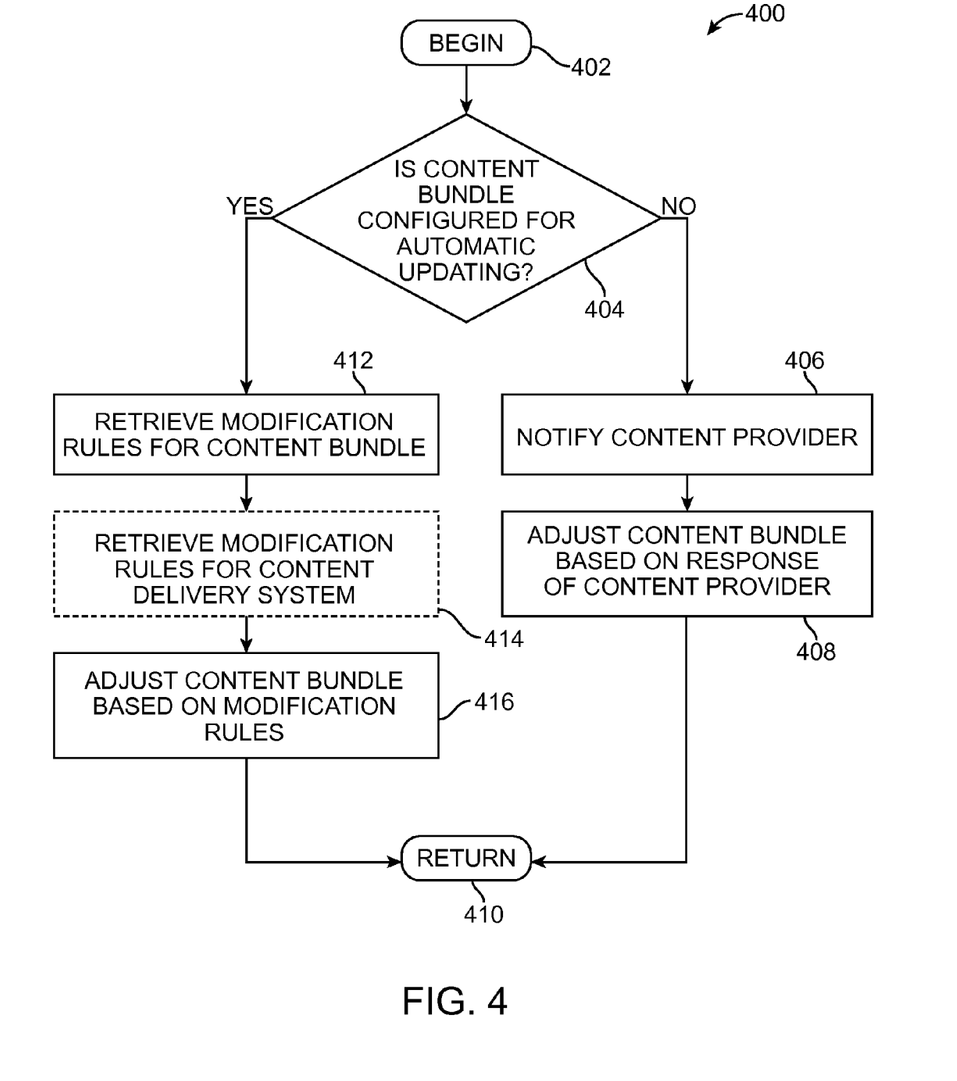
FIG. 4 illustrates an exemplary method embodiment for updating content bundles.

FIG. 4 illustrates an exemplary method embodiment 400 for updating content bundles. For example, method 400 can be used to implement block 316 in method 300. Method 400 begins at block 402 and continues on to block 404. At block 404, it is first determined whether or not the content bundle can be automatically updated. This can be determined in several ways. In some configurations, the content bundle can include a flag or other indicator signaling to the updater system 214 to automatically update the content bundle. For example, the flag or indicator can simply be whether or not modification rules have been specified for the content bundle, for the content delivery system 206, or both. However, the various embodiments are not limited in this regard and a separate flag or indicator can be provided.

If it is determined at block 404 that automatic updating is not available, the method can proceed to block 406 for manual processing. At block 406, a notification can be forwarded to the invitational content provider. The notification can include one or more types of information. For example, the notification can include the analysis data from analysis module 215, one or more recommendations for action, or any other information that might be useful to the invitational content provider for determining how to modify the content bundle. Thereafter, based on the response of the invitational content provider, the content bundle can be adjusted or modified at block 408. The method 400 can then resume previous processing at block 410, including repeating method 400.

Although blocks 406 and 408 are described above as providing manual processing, these blocks are also utilized to enable an automatic updating of the content bundle at locations other than at content delivery system 206. That is, in some configurations, the updater module 214 may not be a part of the content delivery system 206. Instead, the updater module 214 can be under the control of the invitational content provider. In such cases, the notification can include any information needed by the updater module at this location. The response from the invitational content provider can then be delivery or identification of an updated content bundle to the content delivery system 206.

Referring back to block 404, if the content bundle is configured for automatic updating, the method can proceed to block 412. At block 412, the modification rules for the content bundle can be retrieved. In some cases, modification rules specified by the content delivery system can also be retrieved at block 414. Although FIG. 4 illustrates performing block 412 and optionally performing block 414, this is for illustrative purposes only. In some embodiments, instead of block 414 being optional, block 412 can be optional. For example, the present disclosure contemplates circumstances in which a content bundle may not identify any modification rules, but the content delivery system 206 does. Further, in some embodiments, neither of blocks 412 nor 414 are optional.

In the various embodiments, the modification rules can be embodied in different ways. For example, in some configurations, the modification rules can be one or more formulas into which the results of the analysis at analysis module 215 are entered. The results of the formula then indicate how the content bundle is to be adjusted. In other configurations, the modification rules can be a set of thresholds to compare against the results of the analysis. In these configurations, the updater module 214 effects changes in the content bundle when a particular set of criteria is met (or not met). In still other configuration, the analysis can determine patterns of behavior among the various user terminals and the updater module 214 can change the content bundle to provide an assembly of invitational content that best corresponds, with respect to responses, to such patterns. Other configurations are also possible and can be used with the present technology without limitation.

In some cases, the modification rules provided for the content bundle and the content delivery system 206 can be configured to operate cooperatively. For example, the rules from block 414 can provide default rules which are applied unless a corresponding or related rule is provided at block 412. In another example, the rules obtained at block 414 can delineate boundaries for the rules obtained at block 412. That is, content delivery system 206 can be configured to limit or prevent the use of certain types of content blocks. In such cases, the amount of modification allowed by the rules obtained at block 412 is adjusted by the rules obtained at block 414. For example, if the modification rules from block 412 provide for altering the content bundle to include content blocks associated with higher bandwidth versions of a video and the content delivery system 206 is operating on a network 204 upon which such videos would not be supported or in which bandwidth is limited, the rules from block 414 can be used to override the rules from block 412 and prevent the use of such content blocks. Other cooperative arrangements are also possible and can be used with the present technology without limitation.

Once the content bundle is adjusted at block 416, the method 400 can proceed to block 410 and resume previous processing, including repeating method 400.

In some cases, there may be configurations of the content bundle that may be preferred by the content delivery system 206. That is, although the invitational content preferred by the invitational content provider or the current content bundle for a campaign is fully supportable by the content delivery system 206, the content delivery system may wish to limit overall usage of its resources for quality of service reasons, to reserve resources for additional content, to present only certain types of invitational content, or any other reasons. For example, it may be preferable to limit the bandwidth utilized by the content delivery system 206 for one of more portions of the targeted segment in order to meet bandwidth restrictions of a network provider or to ensure quality of service to the targeted segment and any other segments associated with the content delivery system 206. Thus, the content delivery system 206 may prefer that the invitational content for the portions associated with a content bundle be limited to lower bandwidth content. Accordingly, the present disclosure contemplates providing a mechanism for eliciting invitational content providers to accept alternate configurations for content bundles. This is illustrated with respect to FIG. 5.

Figure 5:
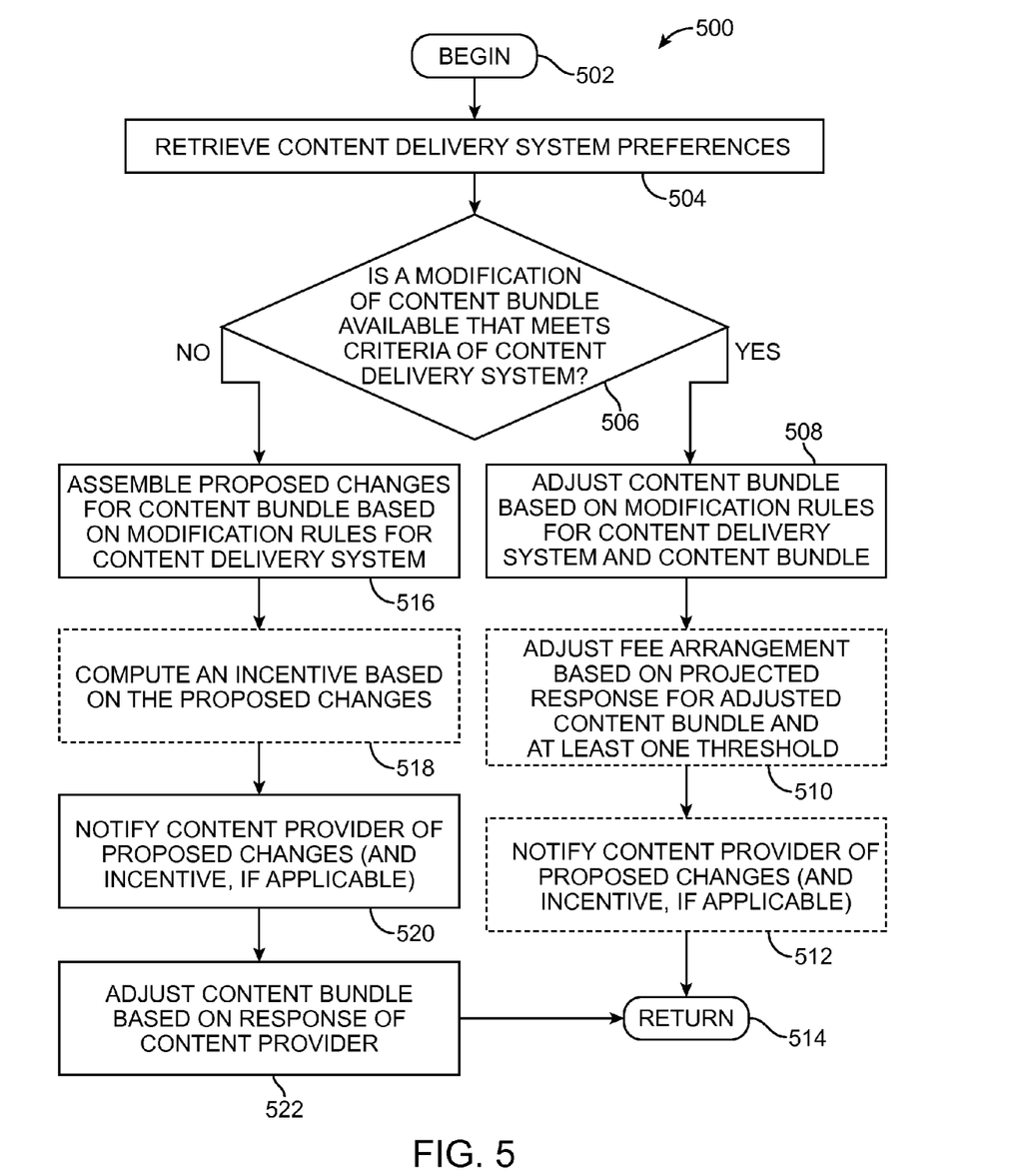
FIG. 5 illustrates an exemplary method embodiment for assembling changes for the updating of content bundles.

FIG. 5 illustrates an exemplary method embodiment 500 for assembling changes for the updating of content bundles when automatic updating of the content bundle is available. That is, at least some modification rules are in place at either the content delivery system or are specified by the content bundle, as previously described with respect to FIG. 4. Method 500 begins at block 502 and continues on to block 504. At block 504, the preferences of the content delivery system are obtained. As noted above, these can include preferences with respect to resources required for the invitational content, preferences with respect to the content within the invitational content, or any other preferences for the content delivery system with respect to invitational content.

Once the preferences are obtained at block 504, the method 500 can determine at block 506 whether or not a modification of the content bundle is possible in view of the preferences of the content delivery system 206. That is, whether any modification rules in place would allow the content bundle to be adjusted in accordance with the preferences. If such a modification is possible in view of the existing modification rules, the method proceeds to block 508 to automatically adjust the content bundle.

The present disclosure contemplates that such modification could result in a sub-optimal level of response for the invitational content being generated by the adjusted content bundle. Accordingly, in some embodiments the content delivery system 206 can be configured to compensate the invitational content provider. In particular, a financial incentive can be applied in view of the change at block 510. In some cases, the incentive can be pre-defined. In other cases, the incentive can be computed. For example, the incentive can be based on a projection of the performance of the adjusted content bundle. Other methods of computing the incentive can also be used without limitation.

Optionally, a notification of the changes can be forwarded to the invitational content provider at block 512. Thereafter, the method 500 can resume previous processing at block 514, including repeating method 500.

Referring back to block 506, if a modification is not possible, further input from the invitational content provider may be needed. First, at block 516, a proposed set of changes for the content bundle can be assembled. For example, the proposed content bundle can be generated based on the preferences of the content delivery system. Optionally, at block 518, a proposed incentive for the proposed content bundle can be computed. Thereafter, the proposed set of changes (and incentive, if any) can be forwarded to the invitational content provider at block 520. Finally, based on the response received from the invitational content provider at block 520, the content bundle can be adjusted at block 522. Method 500 can then resume previous processing at block 514, including repeating method 500.

The present disclosure contemplates that block 522 can include a negotiation between the content delivery system 206 and the invitational content provider. This can involve repeating blocks 516-520 for various configurations until a positive response is received at block 520.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method comprising:
receiving, at a content delivery system, a content bundle comprising a plurality of content blocks for assembling modular invitational content and rules for dynamically assembling the modular invitational content for a user terminal by combining blocks from the plurality of content blocks in the content bundle based at least on preferences and properties associated with the user terminal, wherein the rules are provided by a content provider to define how to assemble the modular invitational content for the user terminal based on the preferences and properties;
delivering, based on the content bundle, the modular invitational content to the user terminal to yield delivered invitational content, the delivered invitational content comprising selected content blocks from the plurality of content blocks assembled based on at least one of the rules, the preferences associated with the user terminal, or the properties associated with the user terminal; and
after an analysis of a user response to at least a portion of the selected content blocks in the delivered invitational content, modifying the content bundle based on the analysis of the user response.

2. The method of claim 1, wherein the delivering comprises providing a plurality of content delivery units for assembling the blocks of invitational content, wherein the modifying comprises analyzing the user response with respect to each of the plurality of content delivery units and adjusting the content bundle separately for each of the plurality of content delivery units based on the analyzing.

3. The method of claim 1, wherein the delivering comprises combining items of invitational content with primary content from each of a plurality of different content providers, wherein the modifying comprises analyzing the user response with respect to each of the plurality of different content providers and adjusting the content bundle separately for each of the plurality of different content providers based on the analyzing.

4. The method of claim 1, wherein the content bundle further comprises modification rules, and wherein the modifying further comprises automatically adjusting the content bundle based at least on the modification rules and the analysis.

5. The method of claim 4, wherein the modification rules specify any of additional content blocks, updated assembly rules, and updated modification rules.

6. The method of claim 4, wherein the automatic adjusting is further based on at least one criterion associated with the content delivery system.

7. The method of claim 6, wherein the modifying further comprises automatically adjusting a fee arrangement associated with the content bundle.

8. A non-transitory computer-readable medium having stored therein instructions which, when executed by a processor, cause the processor to perform operations comprising:
   receiving, at a content delivery system, a content bundle comprising a plurality of content blocks for assembling modular invitational content and rules for dynamically assembling the modular invitational content for a user terminal by combining blocks from the plurality of content blocks in the content bundle based at least on preferences and properties associated with the user terminal, wherein the rules are provided by a content provider to define how to assemble the modular invitational content for the user terminal based on the preferences and properties;
   delivering, based on the content bundle, the modular invitational content to the user terminal to yield delivered invitational content, the delivered invitational content comprising selected content blocks from the plurality of content blocks assembled based on at least one of the rules, the preferences associated with the user terminal, or the properties associated with the user terminal; and
   after an analysis of a user response to at least a portion of the selected content blocks in the delivered invitational content, modifying the content bundle based on the analysis of the user response.

9. The non-transitory computer-readable medium of claim 8, wherein the modifying further comprises aggregating data from any of the campaign provider, the content delivery service, or the user terminals for the analysis.

10. The non-transitory computer-readable medium of claim 8, wherein the modifying further comprises:
    delivering a message to an invitational content provider associated with the content bundle, the message comprising the analysis; and
    adjusting the content bundle based on a response of the invitational content provider to the message.

11. The non-transitory computer-readable medium of claim 10, wherein the content bundle further comprises modification rules, wherein the providing further comprises:
    generating a proposed modification for the content bundle beyond that allowed by the modification rules based on at least one criterion for the content delivery system;
    selecting at least one incentive based at least on the proposed modification; and
    configuring the message to further comprise the proposed modification and the at least one incentive.

12. A method comprising:
    receiving, at a content delivery system, a content bundle from a content provider, the content bundle comprising a plurality of content blocks for assembling modular invitational content and rules for dynamically assembling the modular invitational content to be delivered to user terminals by combining blocks from the plurality of content blocks in the content bundle based on at least preferences at a user terminal and technical properties of the user terminal, wherein the rules define how to assemble the modular invitational content for the user terminal based on the preferences and properties;
    monitoring responses at a plurality of user terminals to at least a portion of selected content blocks from the plurality of content blocks assembled based on at least one of the rules, the preferences associated with the user terminal, or the properties associated with the user terminal;
    computing adjusted rules projected to generate responses at the plurality of user terminals meeting at least one criterion;
    modifying the content bundle based on the adjusted rules.

13. The method of claim 12, wherein the at least one criterion is associated with the content delivery system.

14. The method of claim 12, wherein the at least one criterion is associated with a content provider associated with the content bundle.

15. The method of claim 12, further comprising implementing the content delivery system as a plurality of content delivery units for independently assembling the blocks of invitation content, wherein the computing comprises analyzing the response with respect to each of the plurality of content delivery units, and therein the modifying comprises adjusting the content bundle separately for each of the plurality of content delivery units based on the computing.

16. The method of claim 12, further comprising configuring the content delivery system to combine the blocks of invitational content with primary content from each of a plurality of different content providers, wherein the computing comprises analyzing the responses with respect to each of the plurality of different content providers, and wherein the modifying comprises adjusting the content bundle separately for each of the plurality of different content providers based on the analyzing.

17. The method of claim 12, wherein the computing further comprises aggregating data from any of the content provider, the content delivery service, or the user terminals for the analysis.

18. A content delivery system, comprising:
    a content bundle database for storing a content bundle comprising a plurality of content blocks for assembling modular invitational content and rules for dynamically assembling the modular invitational content for a user terminal by combining blocks from the plurality of content blocks in the content bundle based at least on preferences and properties associated with the user terminal, wherein the rules are provided by a content provider to define how to assemble the modular invitational content for the user terminal based on the preferences and properties;
    a content management module for generating and delivering, based on the content bundle, the modular invitational content to user terminals to yield delivered invitational content, the delivered invitational content comprising selected content blocks from the plurality of content blocks assembled based on at least one of the rules, the preferences associated with the user terminal, or the properties associated with the user terminal;
    an analysis module for generating an analysis of a response at the user terminals to at least a portion of the selected content blocks in the delivered invitational content; and
    an updater module for modifying the content bundle based at least on the analysis.

19. The system of claim 18, wherein the content management module delivers the blocks of invitational content by combining the blocks of invitational content with primary content from each of a plurality of different content providers, wherein the analysis module analyzes the response with respect to each of the plurality of different content providers, and wherein the updater module is configured for adjusting the content bundle separately for each of the plurality of different content providers.

20. The system of claim 18, wherein the content bundle further identifies modification rules, and wherein the updater module is further configured for automatically adjusting the content bundle based at least on the modification rules and the analysis.

21. The system of claim 20, wherein the modification rules specify any of additional content blocks, updated assembly rules, and updated modification rules.

22. The system of claim 20, wherein the updater module is configured for automatic adjusting the content bundle based on at least one criterion associated with the content delivery system.

23. The system of claim 22, further comprising a campaign engine configured for automatically adjusting a fee arrangement associated with the content bundle responsive to the automatic adjusting by the updater module.

24. The system of claim 18, wherein the analysis module is configured for aggregating data for the analysis from any of the campaign provider, the content delivery service, or the user terminals.

25. A method, comprising:
receiving, at a content delivery system, a content bundle comprising a plurality of content blocks for assembling modular invitational content and rules for dynamically assembling the modular invitational content for a user terminal by combining blocks from the plurality of content blocks in the content bundle based at least on preferences and properties associated with the user terminal, wherein the rules are provided by a content provider to define how to assemble the modular invitational content for the user terminal based on the preferences and properties;
delivering, based on the content bundle, the modular invitational content to user terminals to yield delivered invitational content, the delivered invitational content comprising selected content blocks from the plurality of content blocks assembled based on at least one of the rules, the preferences associated with the user terminal, or the properties associated with the user terminal; and
computing a cost of an invitational content provider for the delivered invitational content based at least on the portion of the plurality of content blocks selected for the delivered invitational content.

26. The method of claim 25, wherein the billing further comprises:
monitoring interactions at the user terminals with respect to at least a portion of the plurality of content blocks in the delivered invitational content; and
assessing fees for each of the delivered invitational content based at least on types of the interactions at the user terminals.

27. The method of claim 26, wherein the content bundle is further configured for identifying preferred interactions for each of the items of invitational content, and wherein the assessing is based on the preferred interactions.

28. The method of claim 25, wherein the content bundle is further configured for identifying a target for one or more preferred combinations for the plurality of content blocks, and wherein the step of computing further comprises applying a discounted cost for the portion of the delivered invitation content not associated with the preferred combinations.

* * * * *